(12) United States Patent
Ookoshi

(10) Patent No.: US 7,127,945 B2
(45) Date of Patent: Oct. 31, 2006

(54) ANGULAR VELOCITY SENSOR

(75) Inventor: Hideo Ookoshi, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/078,297

(22) Filed: Mar. 14, 2005

(65) Prior Publication Data
US 2005/0199062 A1   Sep. 15, 2005

(30) Foreign Application Priority Data
Mar. 15, 2004   (JP) ............................. 2004-072557

(51) Int. Cl.
*G01P 9/04* (2006.01)
(52) U.S. Cl. .................... 73/493; 73/504.16
(58) Field of Classification Search ............... 73/493, 73/504.04, 504.12, 504.16
See application file for complete search history.

(56) References Cited

U.S. PATENT DOCUMENTS 5,581,032 A * 12/1996 Uemura et al. ............. 73/493
5,767,404 A * 6/1998 Kaiser et al. ............ 73/504.13
6,145,380 A * 11/2000 MacGugan .................. 73/493
6,199,429 B1 * 3/2001 Hirosawa ................. 73/504.15
6,675,652 B1 * 1/2004 Yamazaki ................. 73/504.16
6,739,192 B1 * 5/2004 Okoshi et al. ........... 73/504.16
6,748,807 B1 * 6/2004 Yoshiuchi et al. ............ 73/493
6,880,399 B1 * 4/2005 Okoshi et al. ................ 73/493

FOREIGN PATENT DOCUMENTS

EP          1132712        * 9/2001
JP        10-332378          12/1998

* cited by examiner

*Primary Examiner*—Helen Kwok
(74) *Attorney, Agent, or Firm*—Wenderoth, Lind & Ponack, L.L.P.

(57) ABSTRACT

An angular velocity sensor comprises a receiving member receiving therein a case containing a vibration element and an IC, and having a hole usable in soldering one end of a terminal strip to a case electrode, whereby, after this soldering operation, a condition of a soldered region in a mounting portion can be checked through the hole. This prevents deficiency in a solder amount required for soldering between the case and the receiving member to ensure accuracy in an output signal of the angular velocity sensor.

20 Claims, 13 Drawing Sheets

ANGULAR VELOCITY SENSOR

BACKGROUND OF THE INVENTION

1. Field of the Invention

The present invention relates to an angular velocity sensor applicable to various systems for a moving subject, such as an aircraft or vehicle, for example, attitude control systems and navigation systems.

2. Description of the Background Art

Heretofore, this type of angular velocity sensor has been designed in a structure as shown in FIG. 12, which is disclosed, for example, in Japanese Unexamined Patent Publication No. 10-332378.

FIG. 12 is a perspective view of a vibration element provided in a conventional angular velocity sensor. FIG. 13 is a circuit diagram of this angular velocity sensor, and FIG. 14 is a perspective view of the vibration element installed in a case of the angular velocity sensor.

As shown in FIGS. 12 to 14, vibration element 1 has a rectangular parallelepiped shape, and comprises a first piezoelectric substrate 2, and a second piezoelectric substrate 4 attached to first piezoelectric substrate 2 through an electrode layer 3. Further, two segmented electrodes 5 having both functions of driving and detection are attached on a top surface of the vibration element 1, and a common electrode 6 is attached on a bottom surface of the vibration element 1.

Reference numeral 7 indicates four terminals having an approximately Z shape. Each of the terminals 7 has one end formed as a broadened portion 8. This broadened portion 8 is soldered onto a corresponding one of the segmented electrodes 5 of the vibration element 1 to allow one end of the terminal 7 to be fixedly supported by the segmented electrode 5. Another end of the terminal 7 protrudes outward. The broadened portion 8 of the terminal 7 is positioned at a vibrational node in the vibration element 1.

The conventional angular velocity sensor has a circuit configuration as shown in FIG. 13. Specifically, an oscillator circuit 9 serving as driving means has one output terminal connected to respective segmented electrodes 5 through parallel lines each having a resistor 10 interposed therein, and another output terminal connected to the common electrode 6. One of the segmented electrodes 5 is connected to a non-inverting input terminal (+) of a differential amplifier circuit 12 through a resistor 11, and another segmented electrode 5 is connected to an inverting input terminal (−) of the differential amplifier circuit 12 through a resistor 11. Further, a resistor 13 is interposed in a line connecting between an output terminal of the differential amplifier circuit 12 and the inverting input terminal (−) of the differential amplifier circuit 12. As shown in FIG. 14, the vibration element 1 and the terminals 7 are disposed inside of case 14.

An operation of the above conventional angular velocity sensor will be described below.

In response to applying a driving signal, such as a sinusoidal signal generated from the oscillator circuit 9, to the segmented electrodes 5 through the resistors 10, each of the first piezoelectric substrate 2 and the second piezoelectric substrate 4 bendingly vibrates in a direction orthogonal to a principal plane thereof. Then, when the vibration element 1 is rotated around its axis, a Coriolis force will be generated in proportion to an angular velocity of this rotation. This generated Coriolis force acts in a direction parallel to the principal plane of the first and second piezoelectric substrates 2, 4 and orthogonal to the axis of the vibration element 1. The Coriolis force causes a change in direction of a bending vibration of the vibration element 1, and each of the segmented electrodes 5 generates a signal proportional to the angular velocity. Then, the differential amplifier circuit 12 receives the signal generated in each of the segmented electrodes 5 through the corresponding resistor 11 to detect an angular velocity acting on the angular velocity sensor.

From a viewpoint of improving durability of the angular velocity sensor, it is conceivable to enclose the case 14 in an additional receiving member (not shown) to form a case having a double-walled structure so as to provide enhanced durability of the angular velocity sensor.

However, this structure involves difficulties in inspecting or managing an amount of solder for soldering the receiving member to the case 14 during an operation for surface-mounting the case 14 onto the receiving member. This problem becomes serious along with progress in downsizing of the angular velocity sensor. An insufficient amount of solder during soldering causes a problem in that an unstable or unreliable electrical connection between the case 14 and the receiving member is realized, and deterioration in accuracy of an output signal of the angular velocity sensor is also realized.

SUMMARY OF THE INVENTION

In view of the above problems, it is therefore an object of the present invention to provide an angular velocity sensor capable of preventing a deficiency in an amount of solder for soldering between a case and a receiving member so as to ensure accuracy of an output signal.

In order to achieve the above object, the present invention provides an angular velocity sensor comprising: a vibration element provided with a drive electrode and a detection electrode, and adapted to generate an output signal from the detection electrode; an IC for processing the output signal sent from the detection electrode of the vibration element; a case containing the IC and the vibration element, and having an outer bottom surface provided with a case electrode; a receiving member including a mounting portion which has a case-mounting surface mounting the case thereon; a terminal strip having a first end portion electrically connected to the case electrode, and a second, opposite, end portion which includes a region embedded in the receiving member and a distal end region protruding from the receiving member to serve as an electrode; and a cover sandwiching the case in cooperation with the receiving member. In this angular velocity sensor, the mounting portion of the receiving member is formed with a hole penetratingly extending between the case-mounting surface and an opposite surface thereof; and the first end portion of the terminal strip is disposed within the hole, and soldered to the case electrode.

According to the above angular velocity sensor of the present invention, an amount of solder in a soldering region can be inspected or checked from the hole in the mounting portion after a soldering operation, and, if this solder amount is deficient, additional solder can be supplied. This provides an excellent effect of being able to ensure a stable or reliable electrical connection between the first end of the terminal strip and the case electrode of the case.

Other features and advantages of the present invention will be apparent from the accompanying drawings and from the detailed description.

DETAILED DESCRIPTION OF THE PREFERRED EMBODIMENTS

Figure 1:
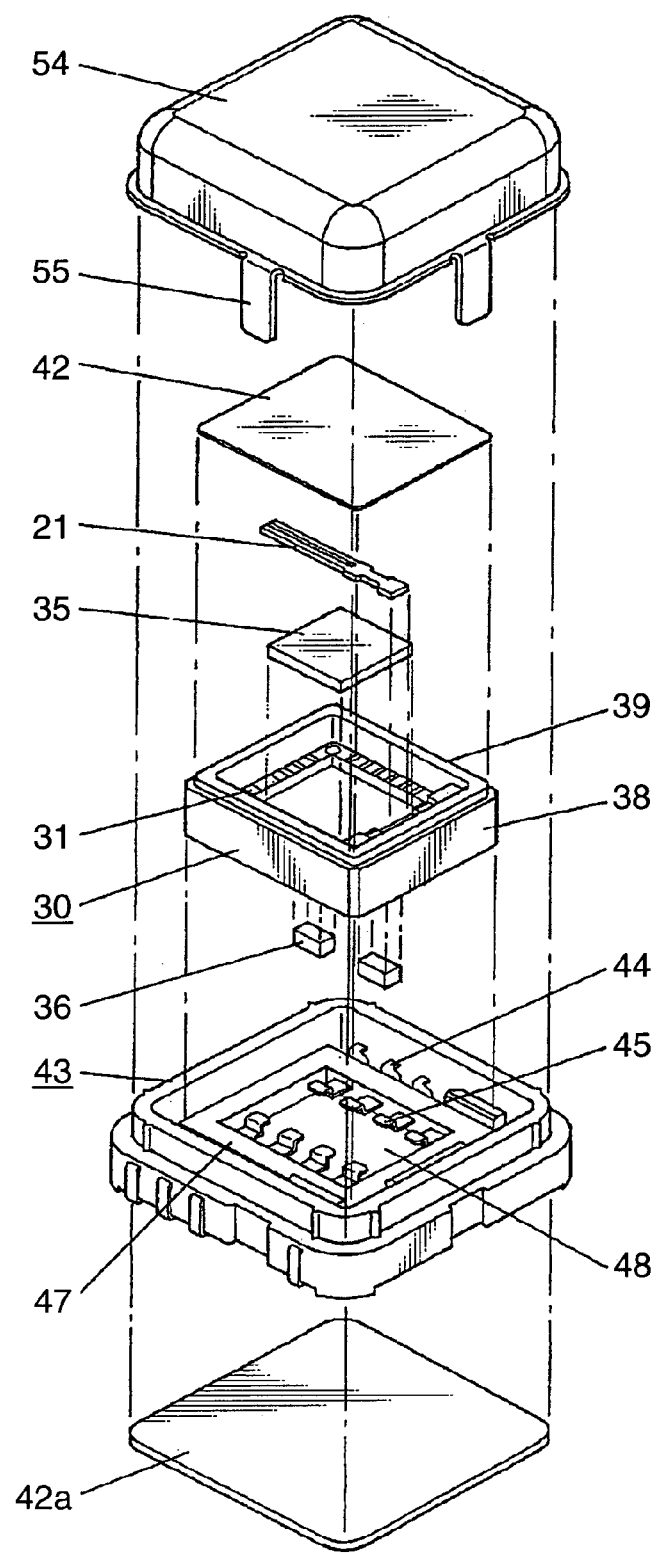
FIG. 1 is an exploded perspective view showing an angular velocity sensor according to one embodiment of the present invention.
Figure 2:
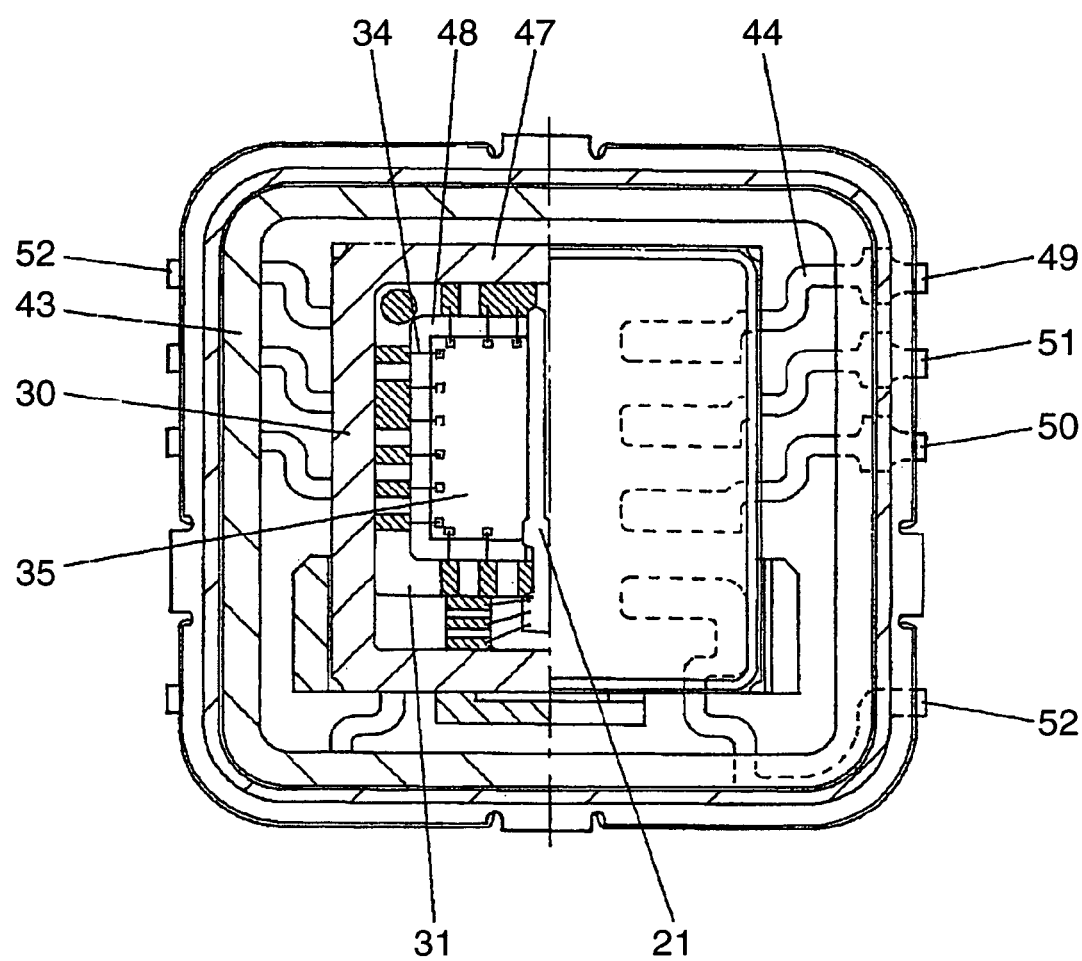
FIG. 2 is a partly sectional top view of the angular velocity sensor.
Figure 3:
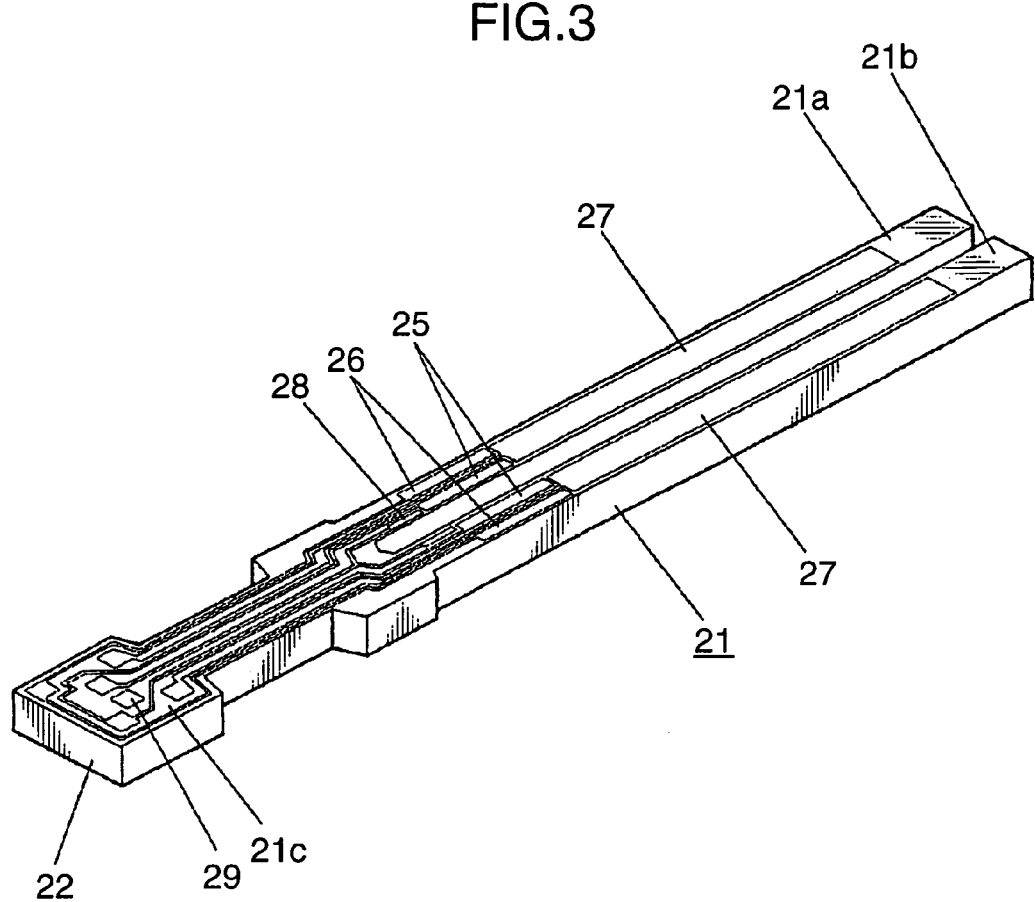
FIG. 3 is a perspective view of a vibration element provided in the angular velocity sensor.
Figure 4:
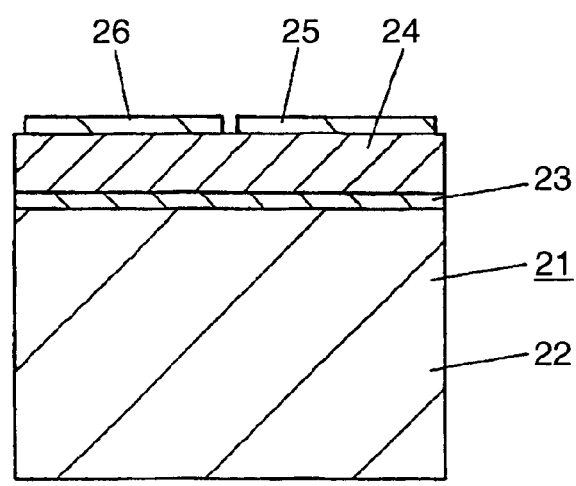
FIG. 4 is a sectional view of a first arm portion of the vibration element provided in the angular velocity sensor.
Figure 5:
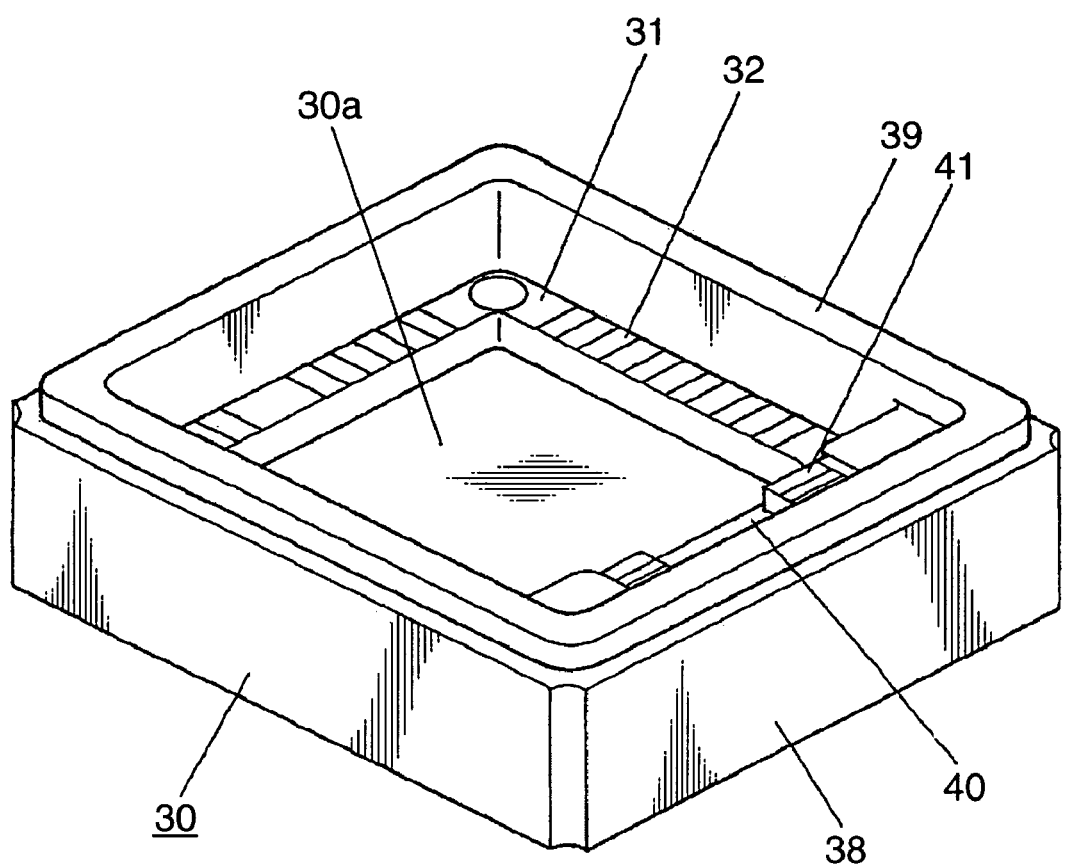
FIG. 5 is a perspective top view of a case provided in the angular velocity sensor.
Figure 6:
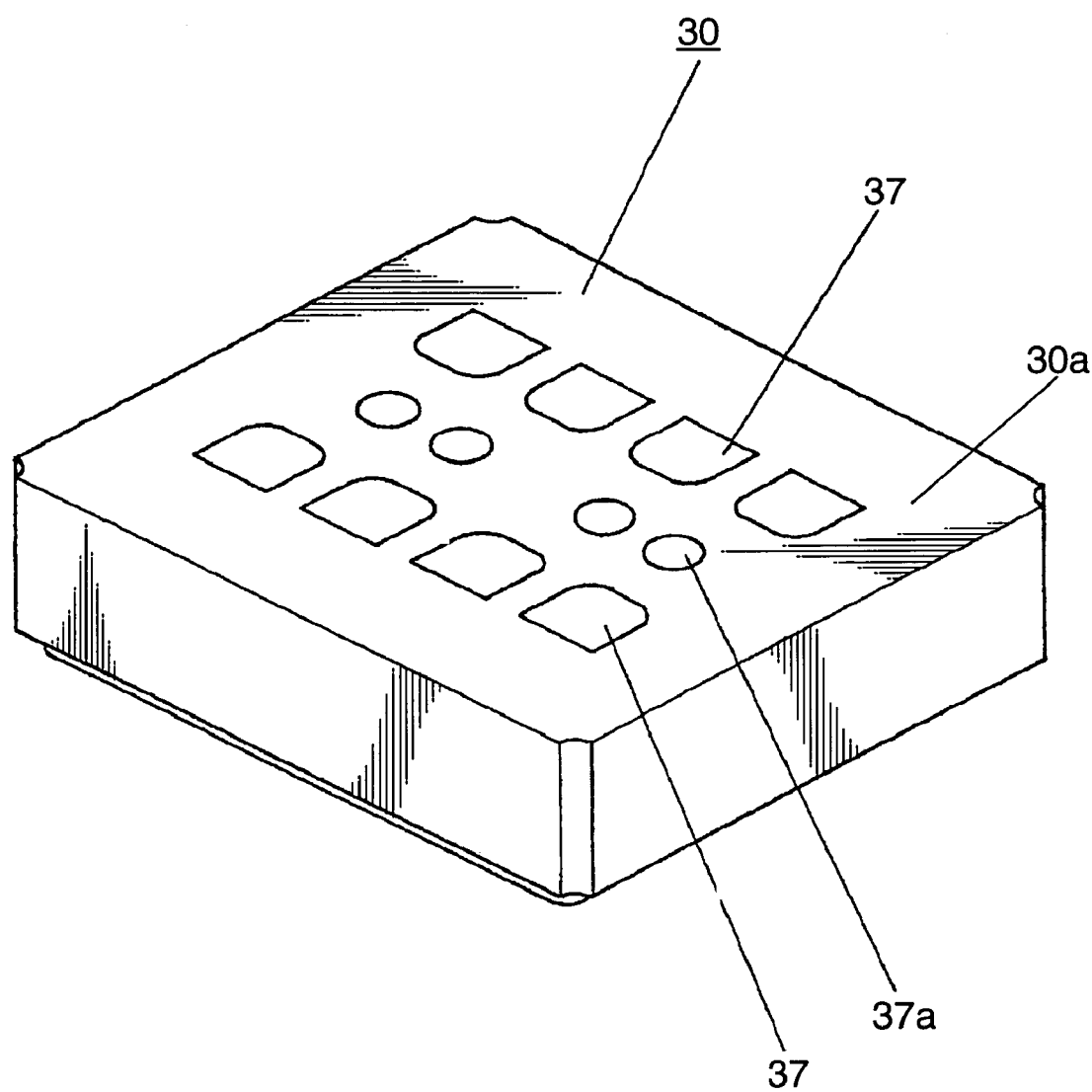
FIG. 6 is a perspective bottom view of the case provided in the angular velocity sensor.
Figure 7:
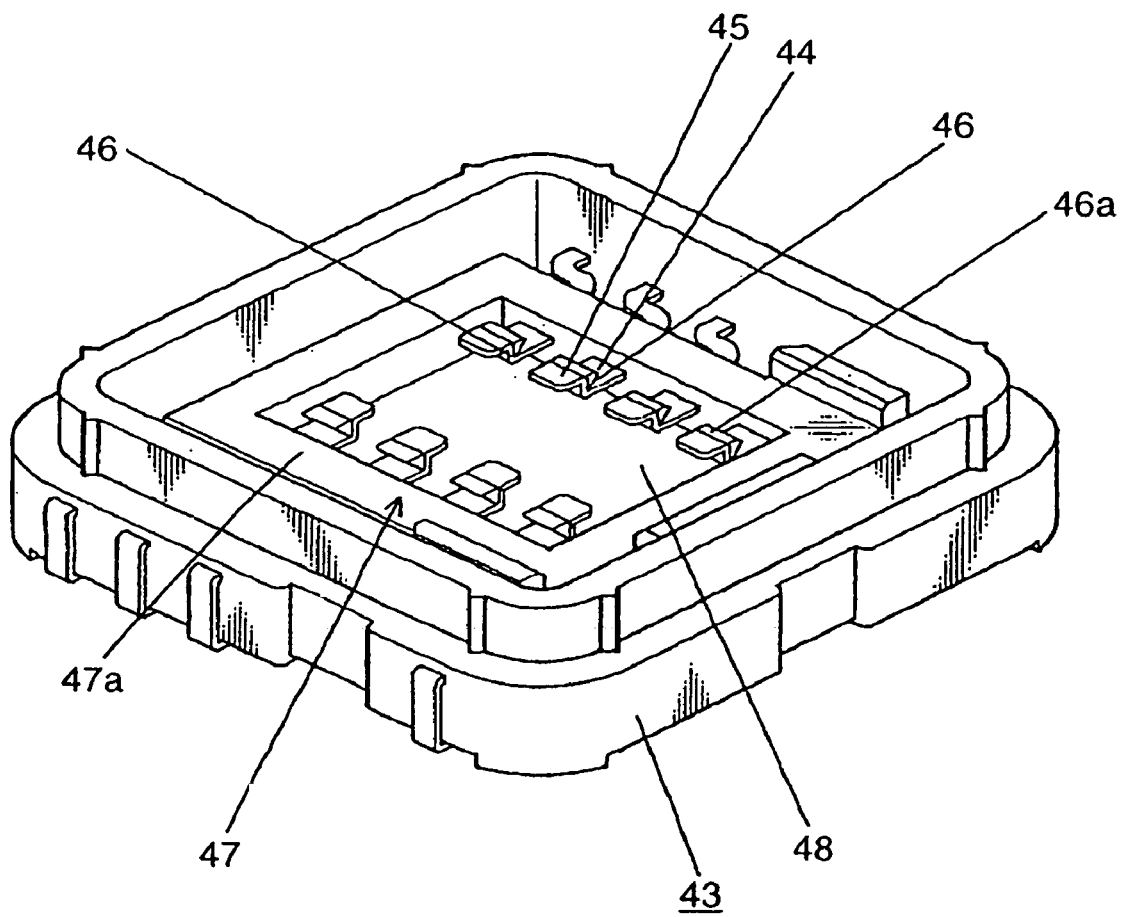
FIG. 7 is a perspective top view of a receiving member provided in the angular velocity sensor.
Figure 8:
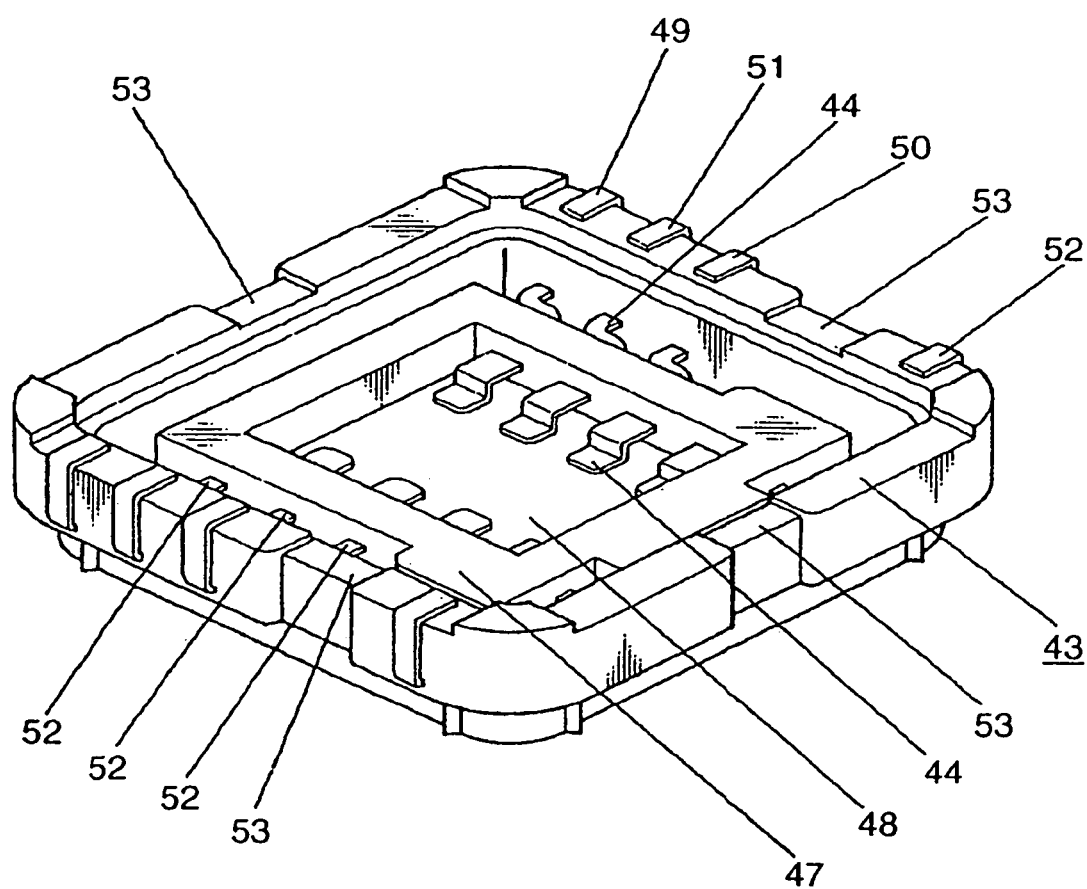
FIG. 8 is a perspective bottom view of the receiving member provided in the angular velocity sensor.
Figure 9:
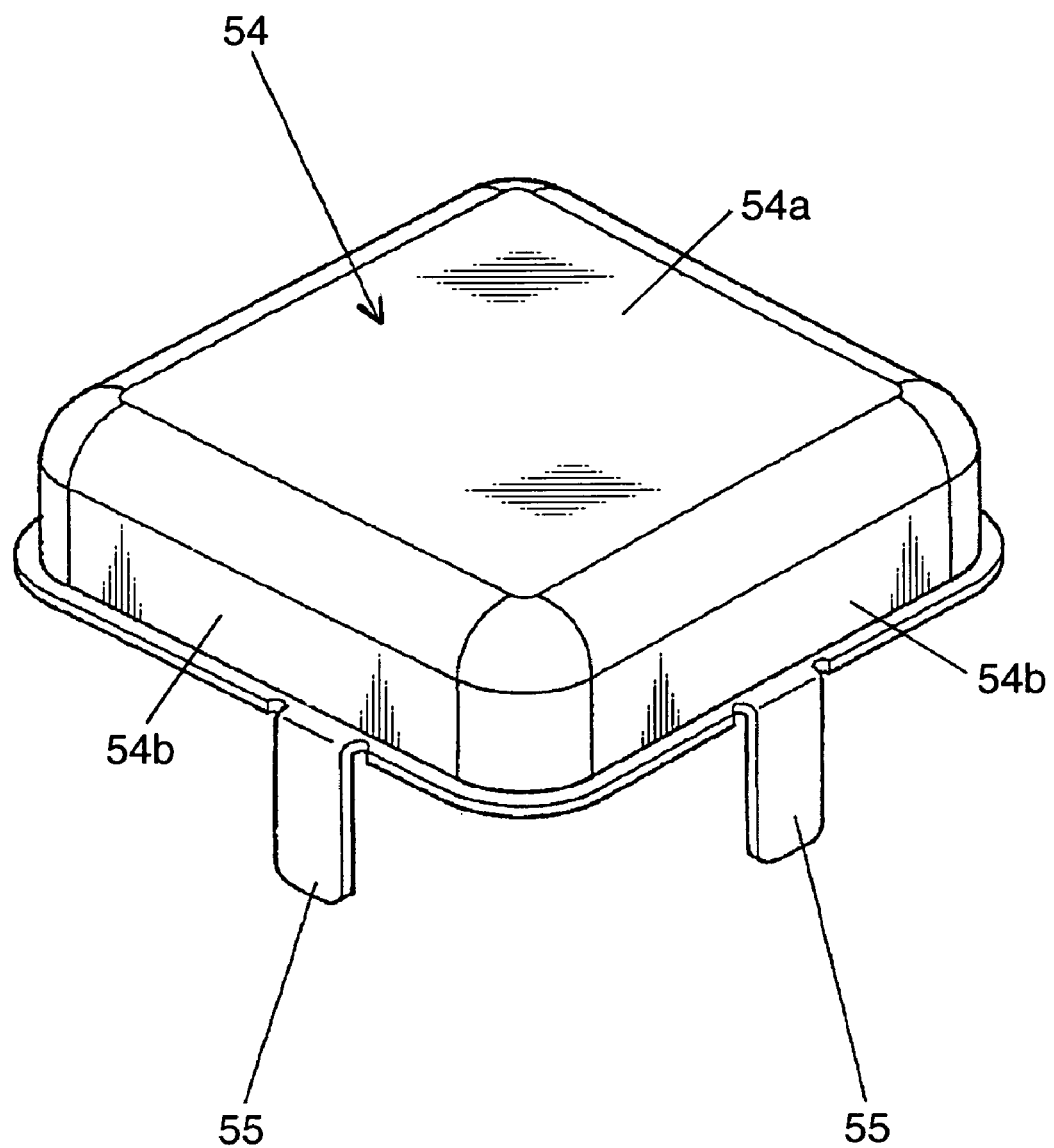
FIG. 9 is a perspective view of a cover provided in the angular velocity sensor.

With reference to the drawings, an embodiment of the present invention will now be described in detail. FIG. 1 is an exploded perspective view showing an angular velocity sensor according to one embodiment of the present invention, and FIG. 2 is a partly sectional top view of the angular velocity sensor. FIG. 3 is a perspective view of a vibration element provided in the angular velocity sensor, and FIG. 4 is a sectional view of a first arm portion of the vibration element provided in the angular velocity sensor. FIG. 5 is a perspective top view of a case provided in the angular velocity sensor, and FIG. 6 is a perspective bottom view of the case provided in the angular velocity sensor. FIG. 7 is a perspective top view of a receiving member provided in the angular velocity sensor, and FIG. 8 is a perspective bottom view of the receiving member provided in the angular velocity sensor. FIG. 9 is a perspective view of a cover provided in the angular velocity sensor.

As shown in FIG. 1, the angular velocity sensor comprises a vibration element 21, a case 30 containing the vibration sensor 21, a receiving member 43 receiving the case 30 therein, and a cover 54 attached to the receiving member 43. The case 30 is sandwiched between the cover 54 and the receiving member 43.

As shown in FIG. 3, the vibration element 21 has a first elongated arm portion 21a, a second elongated arm portion 21b, and a connection portion 21c connecting respective base ends of the first and second arm portions 21a, 21b together, which are generally formed in a tuning fork-like shape.

As seen in FIG. 4 which is a sectional view of the first arm portion 21a, the vibration element 21 includes a substrate 22 made of Si, a common GND electrode 23 provided over an entire top surface of substrate 22, and a piezoelectric layer 24 provided on a top surface of the common GND electrode 23. The common GND electrode 23 is formed of a Pt—Ti alloy thin film. The piezoelectric layer 24 is formed of a PZT thin film.

The vibration element 21 further includes a pair of first drive electrodes 25, a pair of second drive electrodes 26, a pair of detection electrodes 27, a monitor electrode 28, and a GND electrode 29, as shown in FIG. 3. The pair of first drive electrodes 25 is provided on the piezoelectric layer 24, and disposed on an inward side of an approximately longitudinal central region thereof. The pair of second drive electrodes 26 is provided on the piezoelectric layer 24, and disposed on an outward side of the approximately longitudinal central region of the vibration element 21. The pair of detection electrodes 27 is provided on the piezoelectric layer 24, and disposed on a side of a distal end of the vibration element 21 relative to the drive electrodes 25, 26. The monitor electrode 28 is provided on the piezoelectric layer 24, and disposed on a side of a base end of the vibration element 21 relative to the first drive electrode 25. The GND electrode 29 is provided on the piezoelectric layer 24 in the connection portion 21c.

The case 30 is made of ceramic. As shown in FIG. 5, the case 30 has an approximately rectangular-shaped bottom portion 30a, and a rectangular tube-shaped sidewall 38 extending upward from an outer periphery of the bottom portion 30a to define an upper opening.

The bottom portion 30a comprises a multilayer circuit board 31 defining a rectangular depression in a central region of a top surface thereof. The multilayer circuit board 31 is prepared by forming ceramic layers and wiring conductors as a layered structure extending from a top surface (inner surface) to a bottom surface (outer surface) of the bottom portion. The top surface of the multilayer circuit board 31 around the rectangular depression is formed with a plurality of first wiring electrodes 32. Further, an IC 35 electrically connected to the wiring electrodes 32 is inserted into the rectangular depression. An electrical connection between each of the first wiring electrodes 32 and the IC 35 is established by connecting them through a wire line 34 (see FIG. 2) made of gold or aluminum. The IC 35 is designed to process an output signal sent from the detection electrodes 27 of the vibration element 21 in a state after it is received in the case 30.

A metal frame 39 made of kovar is disposed on a top surface of the sidewall 38.

As shown in FIG. 6, an outer surface of the bottom portion 30a of the case 30 is provided with a case electrode 37, and a capacitor electrode 37a. These are made of silver plated with Ni and Au. The case electrode 37 is provided in a number of eight.

An inner surface of the bottom portion of the case 30 is provided with a step portion 40 having a layered structure formed of ceramic layers and wiring conductors. The connection portion 21c (see FIG. 3) of the vibration element 21 is fixedly attached onto the step portion 40. Respective top surfaces of the step portion 40 on both sides of the connection portion 21c are provided with a plurality of second wiring electrodes 41. The second wiring electrodes 41 are connected, respectively, to the first drive electrodes 25, the second drive electrodes 26, the detection electrodes 27, the monitor electrode 28, and the GND electrode 29 in the vibration element 21, through corresponding wire lines 34 (see FIG. 2).

The case 30 is covered by a metal cover plate 42, as shown FIG. 1. This cover plate 42 covers the opening of the case 30 to seal an inner space of the case 30.

The receiving member 43 is made of resin. The receiving member 43 is provided as a means to receive the case 30 therein, and designed to allow a detection axis of angular-velocity to be oriented in a direction parallel to a detected-side base plate (not shown) as a subject of angular velocity detection.

As is also shown in FIGS. 7 and 8, a plurality of terminal strips 44 are fixed to the receiving member 43. Each of the terminal strips 44 has a first end portion electrically connected to a corresponding one of the first drive electrodes 25, the second drive electrodes 26 and the detection electrode 27 through a corresponding one of the case electrodes 37, and a second or opposite end portion including a region embedded in the receiving member 43. In this embodiment, eight terminal strips 44 are provided. The first end portion of each of the terminal strips 44 has a base end region formed as a soldering region 45, and the terminal strip 44 is electrically connected to the corresponding case electrode 37 of the case 30 through solder constituting the soldering region 45. This soldering region 45 is formed approximately parallel to the case electrode 37.

The first end portion of each of the terminal strips 44 further includes a fillet-forming region 46 formed by bending the first end portion so as to extend from the soldering region 45 in a direction approximately perpendicular to the soldering region 45. When the terminal strip 44 is soldered to the corresponding case electrode 37 of the case 30, a fillet 46a will be formed on the fillet-forming region 46.

As above, the terminal strip 44 is bent to form the fillet-forming region 46 perpendicularly to the soldering region 45. Thus, during an operation for soldering the soldering region 45 of the terminal strip 44 to the case electrode 37 of the case 30, a fillet 46a can be formed on the terminal strip 44, so as to assure a sufficient soldering strength between the terminal 44 and the case 30. This makes it possible to provide an angular velocity sensor having enhanced soldering strength.

The receiving member 43 is internally formed or provided with a mounting portion 47 which has a case-mounting surface 47a mounting the case 30 thereon. The case-mounting surface 47a of the mounting portion 47 is formed approximately parallel to the detection axis of angular velocity, and an intermediate region of the terminal strip 44 is embedded in this mounting portion 47. That is, in each of the terminal strips 44, an intermediate region between the soldering region 45 provided in the base end region of the first end portion, and the region of the second end portion embedded in the receiving member 43, is embedded in the mounting portion 47. The case-mounting surface 47a of the mounting portion 47 is formed approximately parallel to the soldering region 45 in each of the terminal strips 44.

A hole 48 is formed in an approximately central region of the mounting portion to penetratingly extend from the mounting surface 47a to an opposite surface thereof (lower surface). The soldering region 45 of each of the terminal strip 44 protrudes inward from the mounting portion 47, and disposed within the hole 48. The hole 48 formed in the mounting portion 47 makes it possible to visually check a height of a fillet 46a serving as a criterion for determining adequacy of a soldered state between the soldering region 45 of the terminal strip 44 and the corresponding case electrode 37 of the case 30. An upper opening of the hole 48 is closed by the case 30, and a lower opening of the hole 48 is closed by a cover plate 42a fitted in the receiving member 43.

As shown in FIGS. 2 and 8, a distal end region of the second end portion in each of the terminal strips 44 is exposed on a side of the outer bottom surface of the receiving member 43. The distal end regions of the terminal strips 44 protruding outward from the receiving member 43 are bent along the receiving member 43, and these bended regions serve as a power electrode 49, a GND electrode 50, an output electrode 51 and five fixing electrodes 52, respectively. In each of the terminal strips, the distal end region protruding outward from the receiving member 43 is formed in an elongated plate-like shape capable of being flexibly deformed. Thus, each of the electrodes 49, 50, 51, 52 extending up to an outer bottom surface (lower surface) of the receiving member 43 is displaceable relative to the receiving member 43. In other words, each of the power electrode 49, the GND electrode 50, the output electrode 51 and the five fixing electrodes 52 is designed to be vertically displaceable.

The cover 54 has a top portion 54a with a rectangular shape, and a sidewall portion 54b extending from respective side edges of the top portion 54a to define an opening (lower opening) located on one of opposite ends of the cover 54. The cover 54 is made of metal, and formed with an engagement claw 55 extending downward from a lower end of the sidewall 54b. This engagement claw 55 is provided four in number. Correspondingly, an outer bottom surface of the receiving member 43 is formed with four hollows 53, as shown in FIG. 8. Thus, each of the engagement claws 55 may be bent and caulked against a corresponding hollow 53 to fasten the cover 54 to the receiving member 43.

A construction process of the above angular velocity sensor according this embodiment of the present invention will be described below.

Figure 10A:
FIGS. 10A to 10F are explanatory diagrams of an assembling process for the vibration element provided in the angular velocity sensor.
Figure 10B:
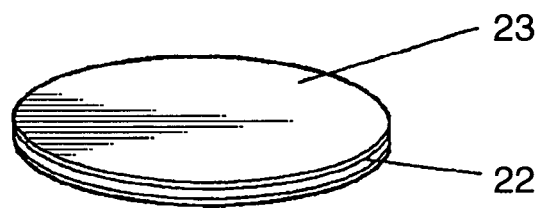
Figure 10C:
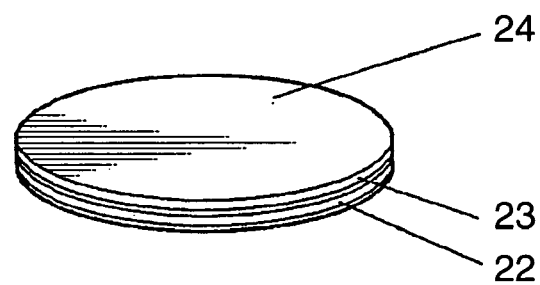

In a process for preparing the vibration element, as shown in FIG. 10B, a Pt—Ti alloy thin film serving as the common GND electrode 23 is firstly vapor-deposited on the substrate 22 made of Si illustrated in FIG. 10A. Subsequently, as shown in FIG. 10C, a PZT thin film serving as the piezoelectric layer 24 is vapor-deposited on a top surface of the common GND electrode 23.

Figure 10D:
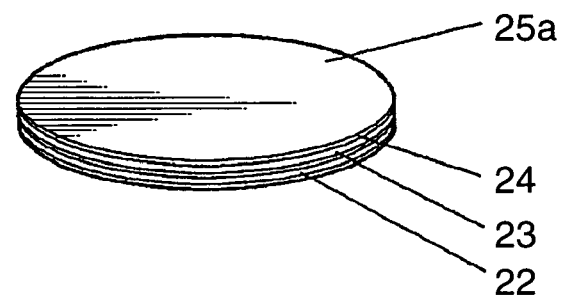
Figure 10E:
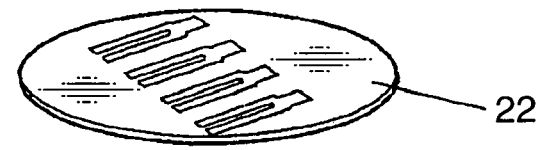

Then, as shown in FIG. 10D, a Ti—Au alloy thin film serving as an in-process electrode 25a is formed on the piezoelectric layer 24 by being vapor-deposited. Subsequently, as shown in FIG. 10E, each unnecessary portion of the common GND electrode 23, the piezoelectric layer 24 and the in-process electrode 25a is removed to provide a given shape thereto. Thus, the above process can provide a product having the first drive electrodes 25, the second drive electrodes 26, the detection electrode 27, the monitor electrode 28 and the GND electrode 29, each of which is formed in a given shape.

Then, the piezoelectric layer 24 is polarized by applying a voltage to the common GND electrode 23, and simultaneously grounding the first drive electrodes 25, the second drive electrodes 26, the detection electrode 27, the monitor electrode 28 and the GND electrode 29.

Figure 10F:
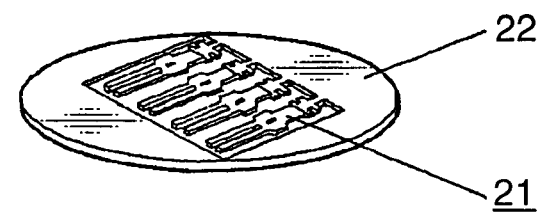

Then, as shown in FIG. 10F, an unnecessary portion of the substrate 22 is removed to form plural number of vibration elements 21.

In a process for preparing the case 30, a plurality of Au layers serving as the first wiring electrodes 32 and the second wiring electrodes 41 are formed on each top surface of the step portion 40, and the multilayer circuit board 31 consisting of insulator layers (not shown) made of ceramic and wiring conductors (not shown), which are prepared in advance. Then, a plurality of case electrodes 37 are formed on a bottom surface of the multilayer circuit board 31.

Then, the sidewall 38 formed using ceramic around an outer periphery of the top surface of the multilayer circuit board 31, and subsequently the metal frame 39 is formed using kovar on the top surface of the sidewall 38.

Then, the IC 35 is mounted on the approximately central region of the multilayer circuit board 31 in the case 30, and subsequently each electrode (not shown) of the IC 35 is electrically connected to a corresponding one of the first wiring electrodes 32 in the multilayer circuit board 31 through the wire line 34 by a wire bonding process.

Then, a bottom surface of the connection portion 21c of the vibration element 21 is fixedly attached onto an upper surface of the step portion 40 of the case 30, and subsequently each of the first drive electrodes 25, the second drive electrodes 26, the detection electrode 27, the monitor electrode 28 and the GND electrode 29, which are formed on the top surface of the vibration element 21, is electrically connected to a corresponding one of the second wiring electrodes 41 through the wire line made of aluminum by a wire bonding process.

Then, the metal cover plate 42 is fixed onto the top surface of the case 30 corresponding to upper opening by seam welding in a nitrogen atmosphere.

In a process for preparing the receiving member 43, eight terminal strips 44 are set in a mold, and then molten resin is supplied into the mold. Through this molding process, the receiving member 43 can be formed with the terminal strips 44 each having the intermediate region embedded in the mounting portion 47, and the region of the second end portion embedded in the receiving member 43, as shown FIG. 7. Then the first end portion in each of the terminal strips 44 is drawn and bent to form the soldering region 45 and the fillet-forming region 46. And, the distal end region of the second end portion in each of the terminal strips 44 is drawn and bent to form the power electrode 49, the GND electrode 50, the output electrode 51 and the five fixing electrodes 52 on the outer bottom surface of the receiving member 43.

Then, after applying solder cream or paste onto each case electrode 37 of the case 30, the case 30 is mounted on the case-mounting surface 47a of the mounting portion 47 in such a manner as to allow the case electrodes 37 to be located in an opposed relationship relative to corresponding soldering regions 45 of the terminal strips 44 of the receiving member 43.

As described above, the first end portion in each of the eight terminal strips 44 is provided with the soldering region 45 formed approximately parallel to the mounting portion 47 of the receiving member 43. Thus, during a soldering operation for soldering between the soldering region 45 of each of the terminal strips 43 and a corresponding one of the case electrodes 37 of the case 30, the soldering regions 45 and the corresponding case electrodes 37 can be located in an opposed relationship relative to each other while keeping respective distances therebetween at the same value. This provides an effect of being able to accurately perform a soldering operation between the case electrodes 37 and the corresponding terminal strips 44 of the receiving member 43.

In addition, the hole 48 formed on an inward side of the mounting portion 47 of the receiving member 43 makes it possible to check a solder amount in the soldering region 45 from the hole 48 in the mounting portion 47. Thus, if the solder amount is deficient, additional solder can be supplied.

This provides an effect of being able to ensure an electrical connection between the first end portion of the terminal strip 44 and the case electrode 37 of the case 30.

Then, the case 30 and the receiving member 43 are put in a high-temperature furnace (not shown) at about 220° C. to melt the solder cream (not shown) and fasten the case electrodes 37 to the corresponding soldering regions 45. Subsequently, the case 30 and the receiving member 43 are cooled. Subsequently, the cover plate 42a is fixed to the bottom surface of the receiving member 43.

Lastly, after covering the receiving member 43 by the metal cover 54, the four engagement claws 55 formed in the cover 54 are caulked against the corresponding ones of the four hollows 53 formed in the outer bottom surface of the receiving member 43.

An operation of the above angular velocity sensor according to this embodiment of the present invention will be described below.

Firstly, when a positive voltage is applied to, the first drive electrodes 25 provided on the first and second arm portions 21a, 21b in the tuning fork-shaped vibration element 21, and a negative voltage is applied to the second drive electrodes 26, the piezoelectric layer 24 located under the first drive electrodes 25 becomes longer, and the piezoelectric layer 24 located under the second drive electrodes 26 becomes shorter. Thus, the first and second arm portions 21a, 21 b are deformed in such a manner as to be moved outward or opened.

Then, when a negative voltage is applied to, the first drive electrodes 25 provided on the first and second arm portions 21a, 21b, and a positive voltage is applied to the second drive electrodes 26, the piezoelectric layer 24 located under the first drive electrodes 25 becomes shorter, and the piezoelectric layer 24 located under the second drive electrodes 26 becomes longer. Thus, the first and second arm portions 21a, 21b are deformed in such a manner as to be moved inward or closed. That is, when an AC voltage is applied to the first drive electrodes 25 and the second drive electrodes 26 in the tuning fork-shaped vibration element 21, the first and second arm portions 21a, 21b will be bendingly moved at a characteristic vibration in an in-plane direction. Further, a voltage value to be applied to the first drive electrodes 25 and the second drive electrodes 26 is adjusted to control an amplitude of a bending movement so as to allow the motor electrode 28 of the vibration element 21 to generate a constant output signal.

Further, if the vibration element 21 is rotated at an angular velocity ω around a longitudinal axis (detection axis) thereof when the first and second arm portions 21a, 21b are being bendingly moved at a characteristic vibration, a Coriolis force F=2 mV×ω will be generated in the first and second arm portions 21a, 21b of the vibration element 21. Then, an output signal corresponding to a charge is generated in the piezoelectric layer 24 under the detection electrode 27 according to the Coriolis force. The output signal is sent to the IC 35 through the detection electrode 27, the wire line 34, the second wiring electrode 41, the multilayer circuit board 31, the first wiring electrode 32 and wire line 34, and subjected to a waveform processing. Then, this processed signal is output through the second wiring electrode 41, the capacitor 36, the case electrode 37, the terminal strip 44 and the output electrode 51. This signal generated from the output electrode 51 can be sent to a detected-side computer (not shown) through a detected-side base plate to detect an angular velocity.

Figure 11A:
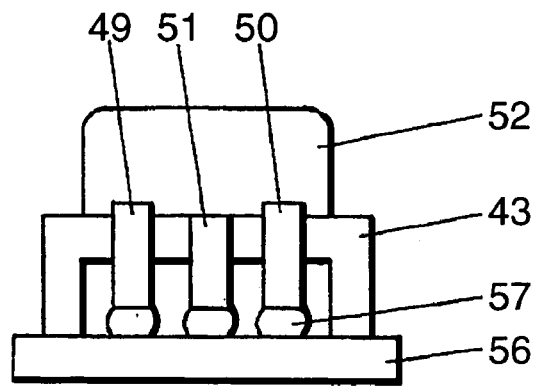
FIGS. 11A to 11C are schematic explanatory diagrams of a process for mounting the angular velocity sensor onto a detected-side base plate.
Figure 11B:
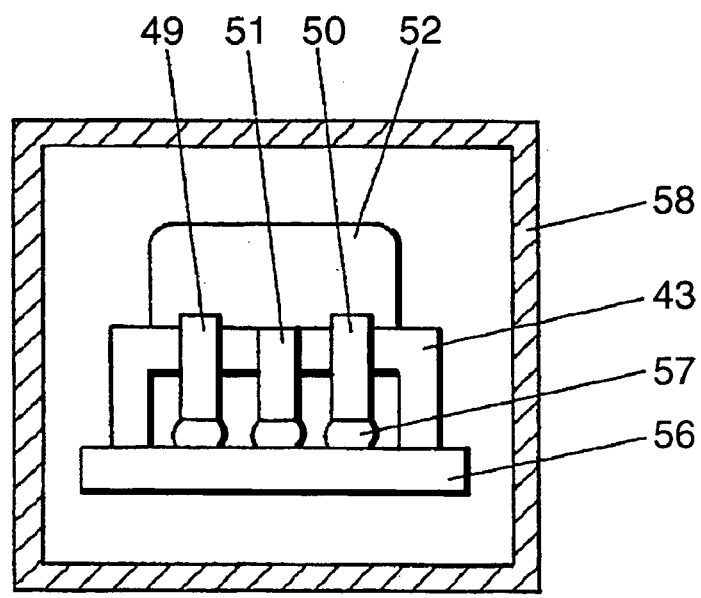
Figure 11C:
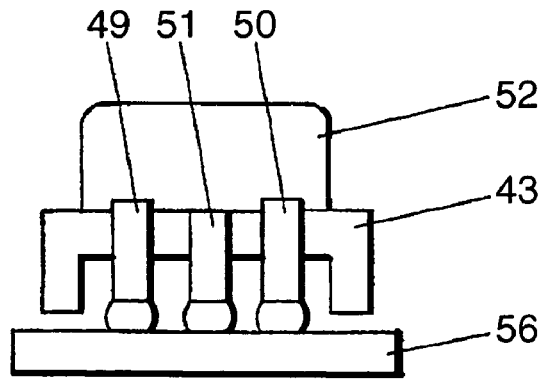
Figure 12:
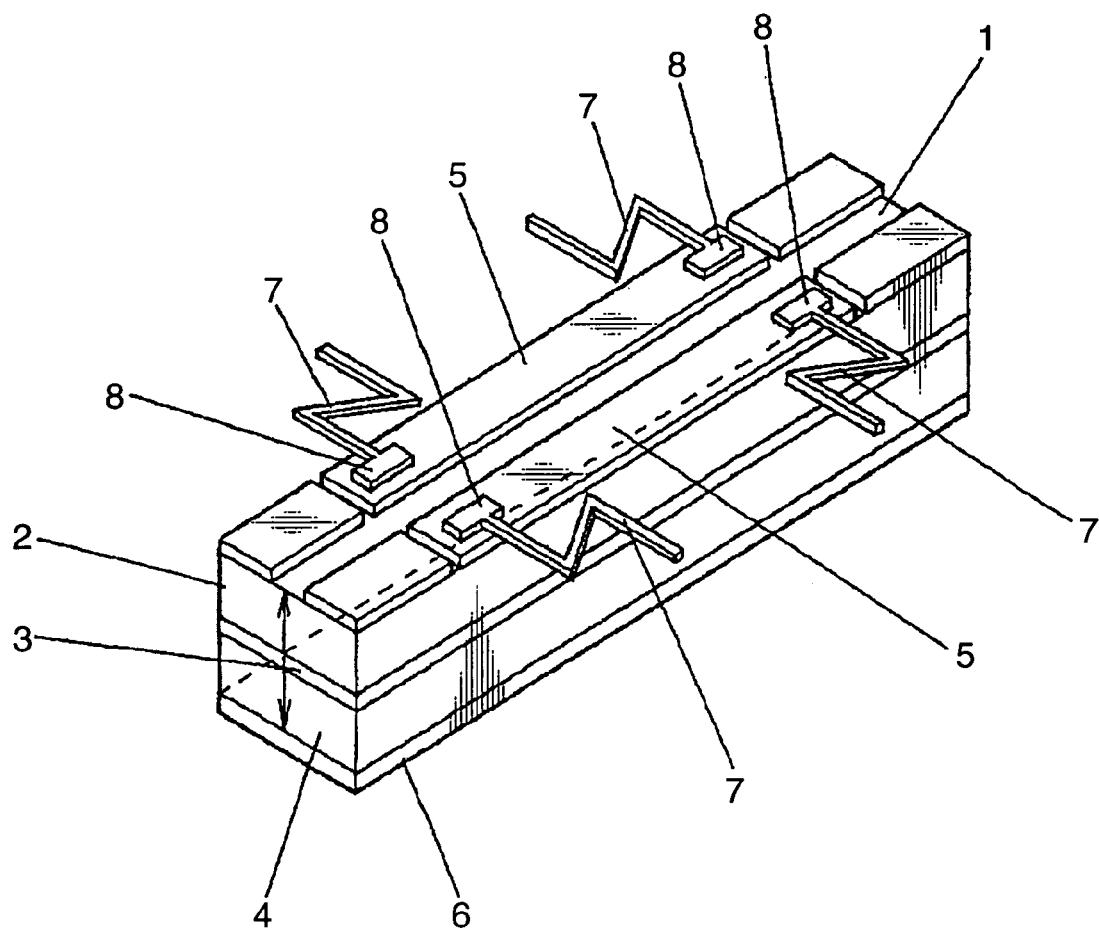
FIG. 12 is a perspective view of a vibration element provided in a conventional angular velocity sensor.
Figure 13:
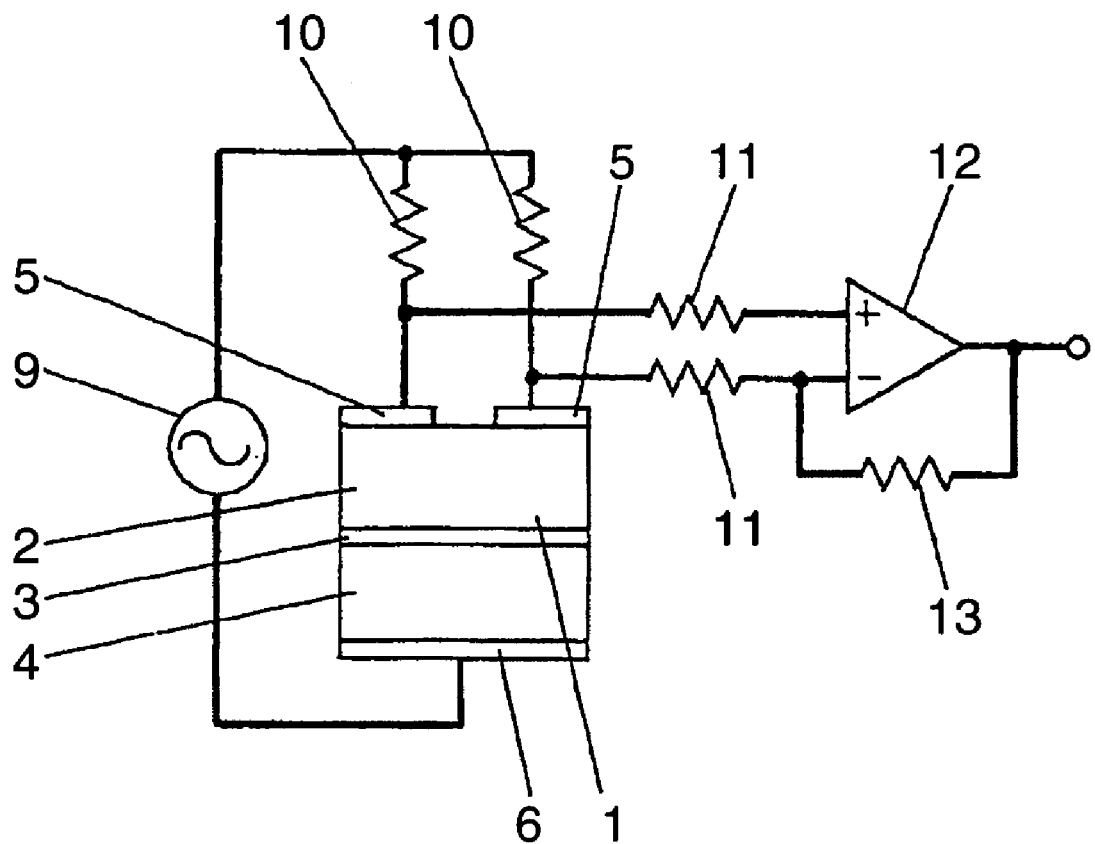
FIG. 13 is a circuit diagram of the conventional angular velocity sensor.
Figure 14:
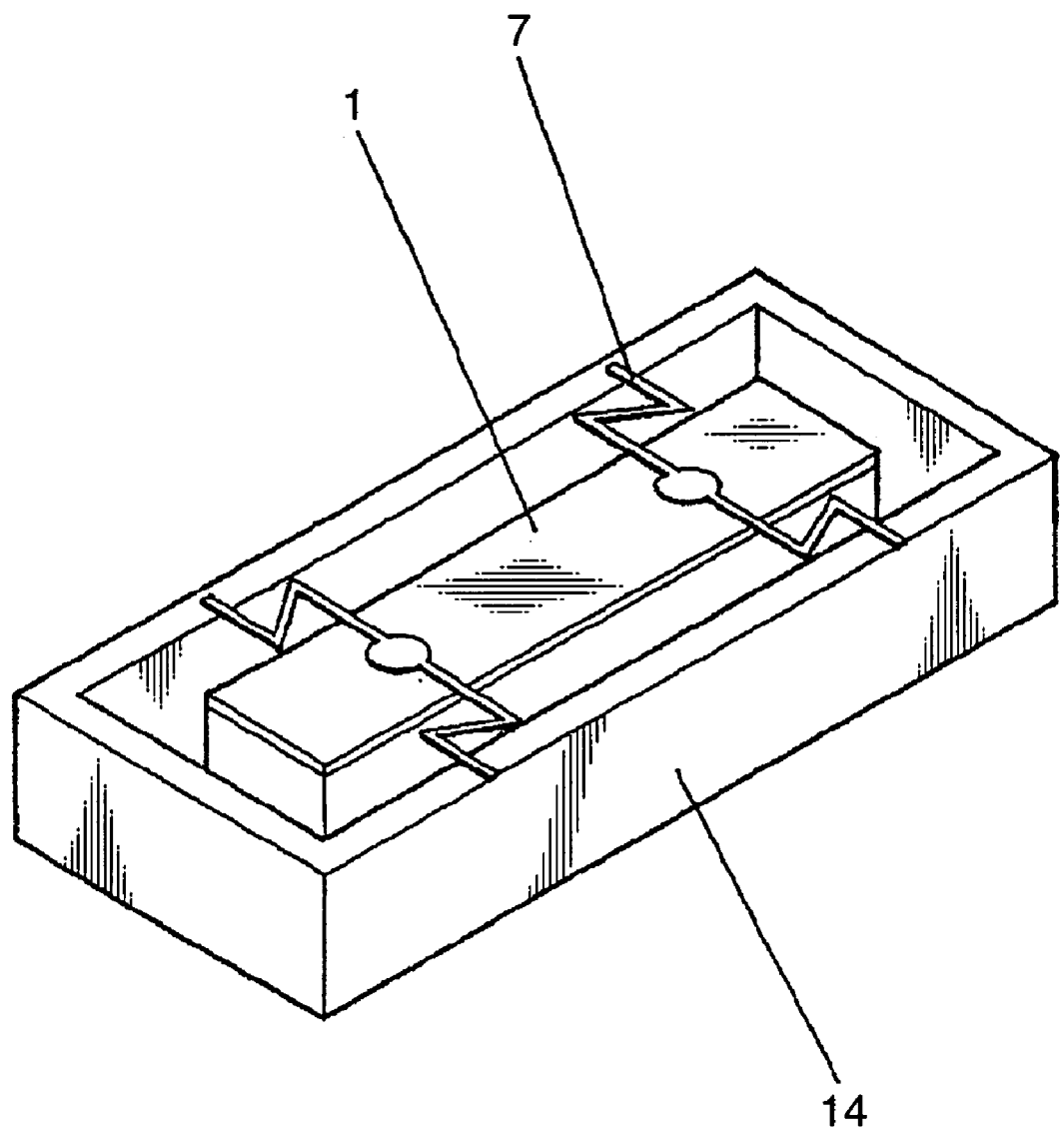
FIG. 14 is a perspective view of the vibration element mounted to a case of the conventional angular velocity sensor

With reference to FIGS. 11A to 11C, an operation for mounting the angular velocity sensor according to this embodiment of the present invention onto the detected-side base plate will be described below.

As shown in FIG. 11A, after applying solder cream 57 to the detected-side base plate, an outer bottom surface of the receiving member 43 is first mounted onto a top surface of the detected-side base plate 56.

Then, as shown in FIG. 11B, the angular velocity sensor is put in a high-temperature furnace 58 at about 220° C., and heated to melt the solder cream 57. Thus, each of the power electrode 49, the GND electrode 50, the output electrode 51 and the fixing electrodes 52 in the angular velocity sensor is fixed to the detected-side base plate 56.

In this structure, each of the power electrode 49, the GND electrode 50, the output electrode 51 and the fixing electrodes 52 in the receiving member 43 is designed to be vertically displaceable. Thus, after soldering the power electrode 49, the GND electrode 50, the output electrode 51 and the fixing electrodes 52 in the receiving member 43 to the detected-side base plate, this prevents a stress from acting on a soldered region between the detected-side base plate 56 and each of the power electrode 49, the GND electrode 50, the output electrode 51 and the fixing electrodes 52, and provides an effect of being able to provide stable reliability in the soldered region between the detected-side base plate 56 and each of the power electrode 49, the GND electrode 50, the output electrode 51 and the fixing electrodes 52.

Lastly, as shown in FIG. 11C, the angular velocity sensor is cooled to complete the operation for mounting the power electrode 49, the GND electrode 50, the output electrode 51 and the fixing electrodes 52 to the detected-side base plate 56.

In this process, the receiving member 43 is designed to have a linear expansion coefficient, for example, of 50 PPM, or greater than that, for example, 18 PPM, of the terminal strip 44. Thus, during cooling just after the soldering operation, the receiving member 43 will have a contraction value greater than that of the terminal strip 44. In this case, if the receiving member 43 is constricted, a distance between the terminal strip 44 and the detected-side base plate 56 will be kept at the same value. This prevents generation of an internal stress in a solder joint between the detected-side base plate 56 and the terminal strip 44 to provide stably maintained reliability in the soldered region.

An advantageous embodiment of the invention has been shown and described. It is obvious to those skilled in the art that various changes and modifications may be made therein without departing from the spirit and scope thereof as set forth in appended claims.

This application is based on Japanese patent application serial No. 2004-072557, filed in Japan Patent Office on Mar. 15, 2004, the contents of which are hereby incorporated by reference.

What is claimed is:

1. An angular velocity sensor comprising:
    a vibration element having a drive electrode and a detection electrode, and adapted to generate an output signal from said detection electrode;
    an IC for processing the output signal when generated by said detection electrode;
    a case containing said IC and said vibration element, and having an outer bottom surface provided with a case electrode;
    a receiving member including a mounting portion which has a case-mounting surface mounting said case thereon;
    a terminal strip having
        (i) a first end portion including a soldering region, and
        (ii) a second, opposite, end portion which includes a region embedded in said receiving member, and a distal end region protruding from said receiving member to serve as an electrode; and
    a cover sandwiching said case in cooperation with said receiving member,
    wherein said mounting portion of said receiving member includes a hole penetratingly extending from said case-mounting surface to an opposite surface of said mounting portion, and
    wherein said soldering region of said first end portion of said terminal strip is disposed within said hole and soldered to said case electrode such that said first end portion is electrically connected to said case electrode.

2. The angular velocity sensor according to claim 1, wherein said outer bottom surface of said case is provided with at least two additional case electrodes, and further comprising:
    at least two additional terminal strips, each of said at least two additional terminal strips having
        (i) a first end portion including a soldering region, and
        (ii) a second, opposite, end portion which includes a region embedded in said receiving member, and a distal end region protruding from said receiving member to serve as an electrode,
    wherein said soldering region of said first end portion of said each of said at least two additional terminal strips is disposed within said hole and soldered to a respective one of said at least two additional case electrodes such that said first end portion of said each of said at least two additional terminal strips is electrically connected to said respective one of said at least two additional case electrodes,
    with said terminal strip and said at least two additional terminal strips being designed to support said case.

3. The angular velocity sensor according to claim 2, wherein
    said soldering region of said first end portion of said terminal strip, and said soldering region of said first end portion of said each of said at least two additional terminal strips, are each approximately parallel to said case-mounting surface of said mounting portion of said receiving member.

4. The angular velocity sensor according to claim 3, wherein
    said first end portion of said terminal strip, and said first end portion of said each of said at least two additional terminal strips, each also include a fillet-forming region extending from a respective said soldering region in a direction approximately perpendicular to said respective said soldering region.

5. The angular velocity sensor according to claim 4, wherein
    said distal end region of said second end portion of said terminal strip, and said distal end region of said second end portion of said each of said at least two additional terminal strips, are each vertically displaceable.

6. The angular velocity sensor according to claim 5, wherein
    said receiving member is made of a material having a linear expansion coefficient greater than a linear expansion coefficient of said terminal strip and said each of said at least two additional terminal strips.

7. The angular velocity sensor according to claim 6, wherein
    said vibration element has a tuning fork-like shape.

8. The angular velocity sensor according to claim 2, wherein
said distal end region of said second end portion of said terminal strip, and said distal end region of said second end portion of said each of said at least two additional terminal strips, are each vertically displaceable.

9. The angular velocity sensor according to claim 2, wherein
said receiving member is made of a material having a linear expansion coefficient greater than a linear expansion coefficient of said terminal strip and said each of said at least two additional terminal strips.

10. The angular velocity sensor according to claim 2, wherein
said vibration element has a tuning fork-like shape.

11. The angular velocity sensor according to claim 2, wherein
said first end portion of said terminal strip, and said first end portion of said each of said at least two additional terminal strips, each also include a fillet-forming region extending from a respective said soldering region in a direction approximately perpendicular to said respective said soldering region.

12. The angular velocity sensor according to claim 1, wherein
said soldering region of said first end portion of said terminal strip is approximately parallel to said case-mounting surface of said mounting portion of said receiving member.

13. The angular velocity sensor according to claim 12, wherein
said first end portion of said terminal strip also includes a fillet-forming region extending from said soldering region in a direction approximately perpendicular to said soldering region.

14. The angular velocity sensor according to claim 13, wherein
said distal end region of said second end portion of said terminal strip is vertically displaceable.

15. The angular velocity sensor according to claim 14, wherein
said receiving member is made of a material having a linear expansion coefficient greater than a linear expansion coefficient of said terminal strip.

16. The angular velocity sensor according to claim 15, wherein
said vibration element has a tuning fork-like shape.

17. The angular velocity sensor according to claim 1, wherein
said distal end region of said second end portion of said terminal strip is vertically displaceable.

18. The angular velocity sensor according to claim 1, wherein
said receiving member is made of a material having a linear expansion coefficient greater than a linear expansion coefficient of said terminal strip.

19. The angular velocity sensor according to claim 1, wherein
said vibration element has a tuning fork-like shape.

20. The angular velocity sensor according to claim 1, wherein
said first end portion of said terminal strip also includes a fillet-forming region extending from said soldering region in a direction approximately perpendicular to said soldering region.

* * * * *